(12) United States Patent
Robinson et al.

(10) Patent No.: US 6,398,138 B1
(45) Date of Patent: Jun. 4, 2002

(54) METHOD OF EXTRACTING NYLON FIBER FROM A COMMINUTER

(76) Inventors: Forrest L. Robinson, 12913 Woodson Dr., Overland Park, KS (US) 66209; Willis R. Campbell, 14129 Locust St., Olathe, KS (US) 66062

( * ) Notice: Subject to any disclaimer, the term of this patent is extended or adjusted under 35 U.S.C. 154(b) by 0 days.

(21) Appl. No.: 09/609,792

(22) Filed: Jul. 3, 2000

Related U.S. Application Data

(62) Division of application No. 09/321,690, filed on May 28, 1999, now abandoned.
(60) Provisional application No. 60/090,496, filed on Jun. 24, 1998.

(51) Int. Cl.[7] ............................................... B02C 19/12
(52) U.S. Cl. ....................... 241/5; 241/19; 241/DIG. 38
(58) Field of Search ............................. 241/5, 39, 31, 241/40, 24.18, 24.19, 24.28, 23, DIG. 38, 19

(56) References Cited

U.S. PATENT DOCUMENTS 5,908,164 A * 6/1999 Robinson et al. ......... 241/24.19
6,059,207 A * 5/2000 Costello et al. .......... 241/24.18

* cited by examiner

Primary Examiner—Mark Rosenbaum
(74) Attorney, Agent, or Firm—Miller Law Group PLLC

(57) ABSTRACT

A process is disclosed for the separation and recovery of fractional components of used carpet. The nylon fiber component separated from the carpet pieces fed into the cyclonic comminuter are lighter than the other fractional components and can be extracted from the comminuter chamber through an extraction valve located in the top wall of the comminuter chamber. The nylon extraction valve includes a valve body with an opening extending generally vertically therethrough and a shaft extending therefrom in a horizontal orientation. The valve body is moved to expose the opening to the interior of the comminuter chamber on an intermittent basis to extract accumulated nylon fibers without disrupting the air flow through the comminuter chamber and the associated comminuting operation. Preferably, the valve body is oscillated back and forth, instead of rotated, in order to minimize the trapping of nylon fibers at the valve opening. Preferably, the rasp bars on the interior wall of the comminuter chamber are oriented to deflect air upwardly toward the nylon extraction valve and facilitate the extraction of accumulated nylon fibers.

8 Claims, 9 Drawing Sheets

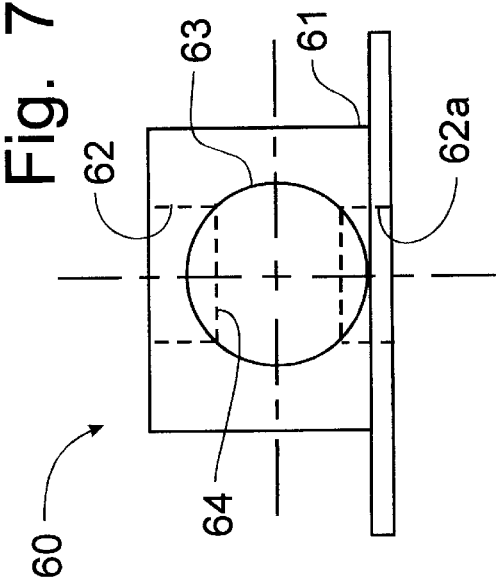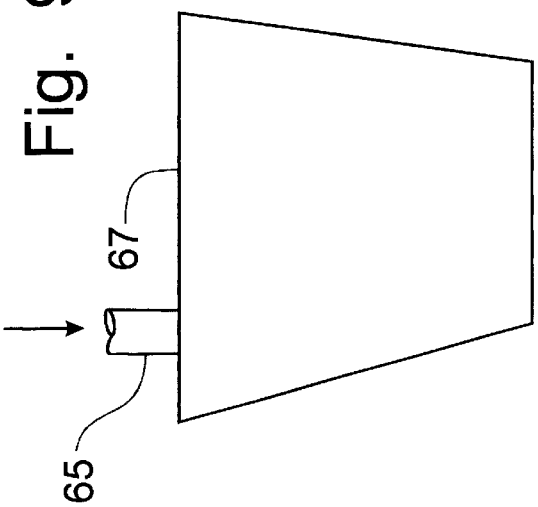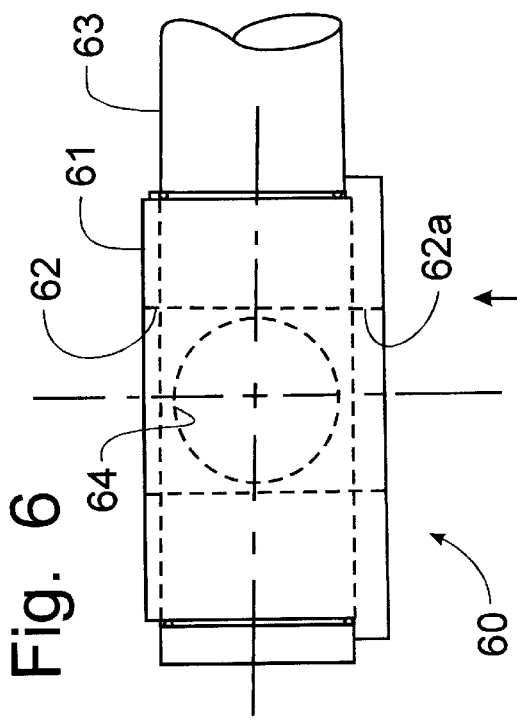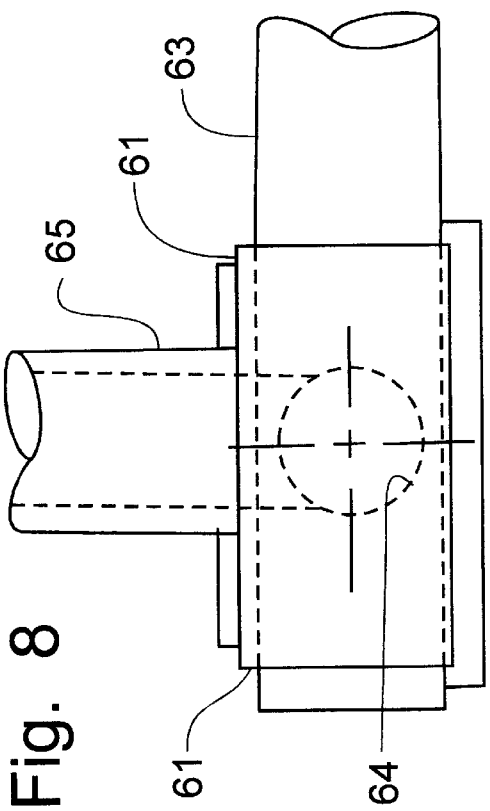

METHOD OF EXTRACTING NYLON FIBER FROM A COMMINUTER

This application is a division of U.S. patent application Ser. No. 09/321,690, filed May 28, 1999, now abandoned, and claims domestic priority from co-pending U.S. Provisional patent application Ser. No. 60/090,496, filed on Jun. 24, 1998.

BACKGROUND OF THE INVENTION

This invention relates generally, to the comminution, separation, recovery and recycling of fractional components of carpet by a process utilizing a cyclonic comminuter.

Carpet recycling has presented a major challenge to the carpet industry that has not been adequately satisfied. The lack of effective recycling processes has resulted in a large volume of carpet material being sent to the landfill. Carpet material is largely non-biodegradable, which is an undesirable situation for the landfills. Furthermore, it is difficult to separate the fractional components of carpet without resulting in the destruction of the components, which limits recycling opportunities. A process that would permit the effective recycling of carpet components would require that the fractional components not be destroyed so that the recovered components can be re-manufactured into quality carpet.

Carpet is manufactured in two general configurations, defined by the backing material, although each of the backing materials is formulated in various forms. These two general classifications of carpet backing are jute and vinyl (which is also referred to as rubber-backed carpet). Jute-backed carpet is manufactured with a top layer of nylon 6 or nylon 6—6, or a mixture of these two nylon fibers. These nylon fibers are woven into strings that are affixed to the backing to present the layer on which the carpet is walked upon. The backing includes polypropylene fibers which are substantially coarser in shape and larger in size than the nylon fibers.

The polypropylene fibers are used to hold the woven nylon strings in place and to fasten the entire matrix of fibers to the backing. Jute, being the primary fiber in burlap, is a glossy plant fiber grown primarily in India. A bonding agent, such as latex, is used to stabilize the jute backing to the polypropylene and, therefore, to the nylon fibers. A weaving process hold the respective fractional components of the carpet together, but the latex bonding agent is the stabilizer. Generally, the latex bonding agent/stabilizer is water soluble.

Vinyl backed carpet, also referred to as rubber-backed carpet, is manufactured similarly to the jute-backed carpet, except for the backing thereof The vinyl may or may not have a stabilizing agent associated therewith, but generally, fiberglass fibers are utilized as a stabilizer. The bonding of the vinyl backing to the other fractional components of the carpet is typically accomplished through a heat process or through the use of a bonding agent, or both.

Accordingly, a process, method and apparatus for separating, recovering and recycling the fractional components of carpet would provide a substantial improvement over the an known prior art processes for disposing of used carpet. Not only would landfill charges be saved, but the recovered fractional components of the carpet have substantial value for the re-manufacture of quality carpet.

SUMMARY OF THE INVENTION

It is an object of this invention to provide a process to reduce used carpet into component fractions to facilitate the recycling of used carpet.

It is a feature of this invention that used carpet can be recycled in an economical manner.

It is an advantage of this invention that the recycling of used carpet will reduce the amount of used carpet being disposed in landfills.

It is another object of this invention to utilize a cyclonic comminuter to reduce used carpet pieces into component fractions.

It is still another object of this invention to provide a process for recycling used carpet by extracting nylon fibers from the chamber of the cyclonic comminuter independently of the primary discharge of material from the comminuter.

It is yet another object of this invention to provide a nylon extraction mechanism for recovering a fractional component of carpet. material comprising primarily nylon fibers from the chamber of the cyclonic comminuter.

It is another feature of this invention that the nylon fibers are extracted from the top of the cyclonic comminuter chamber.

It is another advantage of this invention that the nylon fibers can be extracted from the comminuting process before the fibers are entwined with each other.

It is still another feature of this invention that the nylon fibers can be extracted from the comminuter chamber through a valve placed on the top wall of the comminuter chamber.

It is yet another feature of this invention that the nylon fiber extraction valve is operated intermittently to extract nylon fibers from the chamber of the comminuter.

It is still another advantage of this invention that the intermittent operation of the nylon extraction valve does not disrupt the operation of the cyclonic comminuter in separating the carpet pieces into fractional components.

It is a further feature of this invention that the rasp bars within the interior of the comminuter chamber are oriented to deflect air flow upwardly toward the top wall of the comminuter chamber to urge the lighter nylon fibers into the upper portions of the comminuter chamber.

It is a further object of this invention to provide a process for the separating and recovery of fractional components of used carpet to facilitate the re-cycling thereof which is inexpensive in operation, and simple and effective in use.

These and other objects, features, and advantages are accomplished according to the instant invention by providing a process for. the separation and recovery of fractional components of used carpet. The nylon fiber component separated from the carpet pieces fed into the cyclonic comminuter are lighter than the other fractional components and can be extracted from the comminuter chamber through an extraction valve located in the top wall of the comminuter chamber. The nylon extraction valve includes a valve body with an opening extending generally vertically therethrough and a shaft extending therefrom in a horizontal orientation. The valve body is moved to expose the opening to the interior of the comminuter chamber on an intermittent basis to extract accumulated nylon fibers without disrupting the air flow through the comminuter chamber and the associated comminuting operation. Preferably, the valve body is oscillated back and forth, instead of rotated, in order to minimize the trapping of nylon fibers at the valve opening. Preferably, the rasp bars on the interior wall of the comminuter chamber are oriented to deflect air upwardly toward the nylon extraction valve and facilitate the extraction of accumulated nylon fibers.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a schematic side elevational view of a nylon extraction valve;

FIG. 7 is a schematic elevational end view of the nylon extraction valve looking in the direction of the shaft;

FIG. 8 is a schematic side elevational view of a nylon extraction valve having a discharge conduit connected thereto for conveyance of collected nylon fibers;

FIG. 9 is a schematic diagram of a collection bin connected to the discharge conduit of the nylon extraction valve to receive collected nylon fibers;

DETAILED DESCRIPTION OF THE PREFERRED EMBODIMENT

Figure 1:
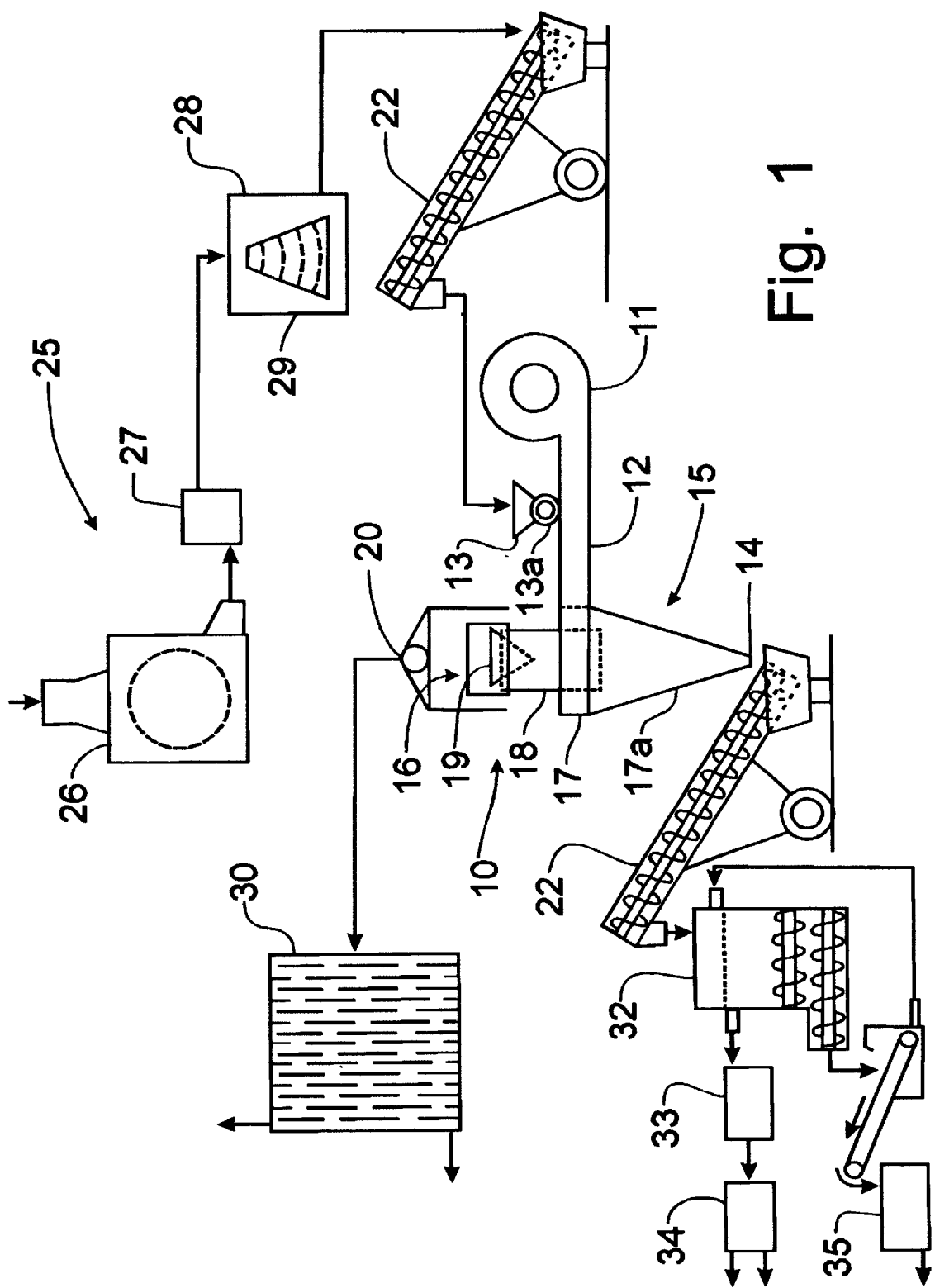
FIG. 1 is a schematic view of apparatus for accomplishing the comminution, separation and recovery of carpet utilizing only a single pass through a comminuting/dehydrating machine, particularly for the recycling of jute-backed carpet.

Comminuting dense material through a cyclonic comminuting/dehydrating machine, such as shown in U.S. Pat. No. 3,794,251, issued on Feb. 26, 1974, for a "Material Reducing System and Apparatus", is well known in the art. A cyclonic comminuting/dehydrating machine similar to that disclosed in U.S. Pat. No. 5,236,132, is schematically depicted in FIGS. 1–3. The descriptive portions of the aforementioned U.S. Pat. No. 3,794,251 and U.S. Pat. No. 5,236,132 are incorporated herein by reference, particularly with respect to the manner and mechanism through which a cyclonic comminuting/dehydrating machine operates.

Such a cyclonic comminuting/dehydrating machine 10 operates to create a high velocity stream of air from a blower 11 that is directed through a conduit 12 into an inverted conical housing 15. The stream of air is directed into a tornado-like swirling motion within the housing 15 before being discharged out the exit opening 16 at the top center portion of the housing 15. A damper 19 controls the flow of air through the air exit opening 16 and the depth of the swirling motion of the air within the housing 15.

A cylindrical sleeve 18, co-operable with the damper 19, is axially movable within the housing 15 to also control the depth of cyclonic comminution of material within the housing 15. The positioning of the sleeve 18 deep into the housing 15 provides for greater comminution of the material fed through the conduit 12, while a shallow penetration of the sleeve 18 into the housing allows for a more rapid exit of the swirling air from the housing 15 through the air exit opening 16 and, therefore, provides only minimal comminution of the material.

A discharged air recovery mechanism 20 captures the discharged stream of air from the air exit opening 16 to prevent the discharge of any fractional components within the discharged air into the atmosphere to control pollution and allow the recovery of any fractional component therein, as will be discussed in greater detail below. A material infeed hopper 13 meters the flow of material into the air stream in the conduit 12 so that the material to be comminuted enters the housing 15 with the stream of air from the conduit 12. Preferably, the infeed hopper 13 includes an air lock 13a having a rotational member that limits the escape of air from the conduit 12 while feeding material into the conduit 12 for flow into the housing 15.

The housing 15 includes a cylindrical portion 17 that receives the air stream, and material flowing therein, from the conduit 12 and directs the air stream into a swirling motion within the housing 15. Depending immediately below the cylindrical portion 17 is a conical portion 17a that directs the swirling air flow into decreasing-radius turns until the air can escape up through the sleeve 18, past the damper 19 and into the discharged air recovery mechanism 20. The conical portion 17a terminates in a material discharge opening 14 at its lowermost extremity for the discharge of comminuted material from the housing 15.

Figure 11:
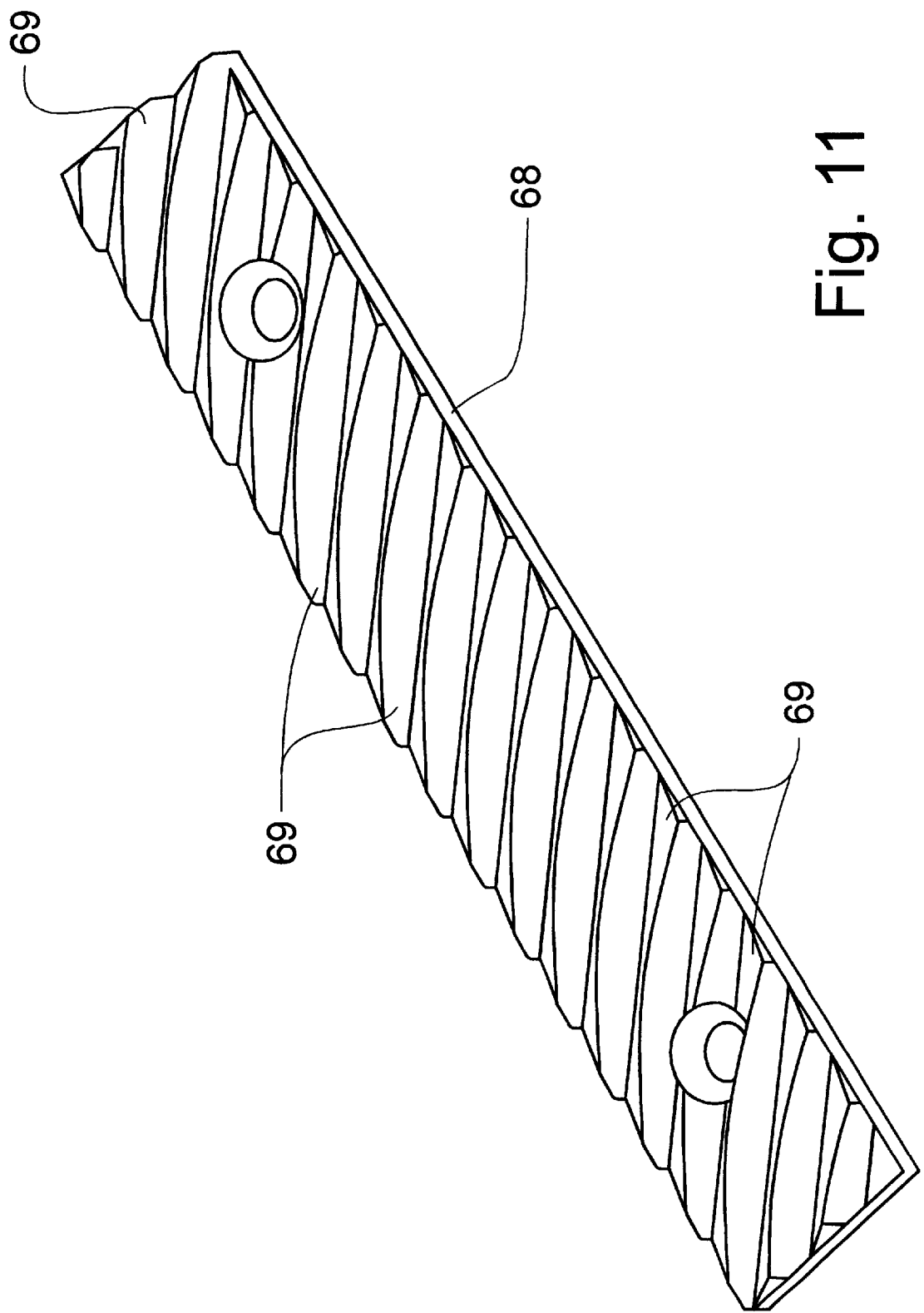
FIG. 11 is a perspective view of a rasp bar having vanes thereon to direct air upwardly toward the nylon extraction valve.

The cylindrical portion 17 is lined with hardened steel rasp bars (not shown) that, coupled with the differential forces associated with the tornado-like swirling motion of the air stream within the housing 15, serve to comminute material fed therein through implosion, impaction and centrifugal force, on the basis of quantity and density of the material fed therein. At least the upper areas of the conical portion 17a preferably also have spirally arranged members (not shown) that assist in the comminution of material within the housing 15 and deflect material upwardly toward the cylindrical portion 17 to further the comminuting process. In a preferred embodiment, these spirally arranged members can be rasp bars, such as shown in FIG. 11, which are preferably arranged to direct air upwardly along with the material entrained therein.

For example, if a bucket of limestone rocks were fed into the housing 15 through the infeed hopper 13, the rocks would be pulverized into small pieces that would drop by gravity through the material discharge opening 14 formed by truncating the end of the inverted conical housing 15. Similarly, a bucketful of steel bolts fed into the housing 15 would also be pulverized into small pieces. If, however, a handful of steel bolts were fed into the air stream with a bucket of limestone rocks, the rocks would still be pulverized, but the steel bolts would be discharged through the material discharge opening 14 substantially unharmed.

The operation of the rasp bars lining the cylindrical portion 17 of the housing 15 serve both to shred and to ricochet solid material particles within the housing 15, which impacts other solid material particles and, coupled with differential velocities of the swirling air within the housing 15, serves to comminute the lesser dense material within the housing 15. Accordingly, with respect to the examples of the limestone rocks and steel bolts given above, the less dense and higher quantity limestone rocks become comminuted into small pieces, while the steel bolts become discharged relatively unharmed.

In Applicants' U.S. Pat. No. 5,727,740, granted on Mar. 17, 1998, the descriptive portions thereof being incorporated herein by reference, method and apparatus for recovering precious stones from soil is disclosed, along with processes for reclaiming precious metals from low grade ore and waste material, recovering lead and lead shot from contaminated soils, and for removing free sulphur from coal. All of these processes involve dense materials or pellets of material having greater density within. a lower density medium that needs to be disintegrated and recovered.

Surprisingly, a cyclonic, dehumidifying comminuting machine 10 similar to that described and shown in the aforementioned U.S. Pat. No. 5,236,132, has been found to be operable to disintegrate pieces of considerably less dense material such as carpet. By controlling the level of comminution within the housing 15 through manipulating the depth of the sleeve 18 into the housing 15 and the operation of the damper 19, the amount of comminution of the carpet pieces can be selectively controlled. This control permits the development of processes that can recover the fractional components of both jute- backed and vinyl-backed carpets. In an alternative embodiment, the sleeve 18 can be fixed positionally with respect to the housing 15 in order to comminute a specific type of material.

Figure 4:
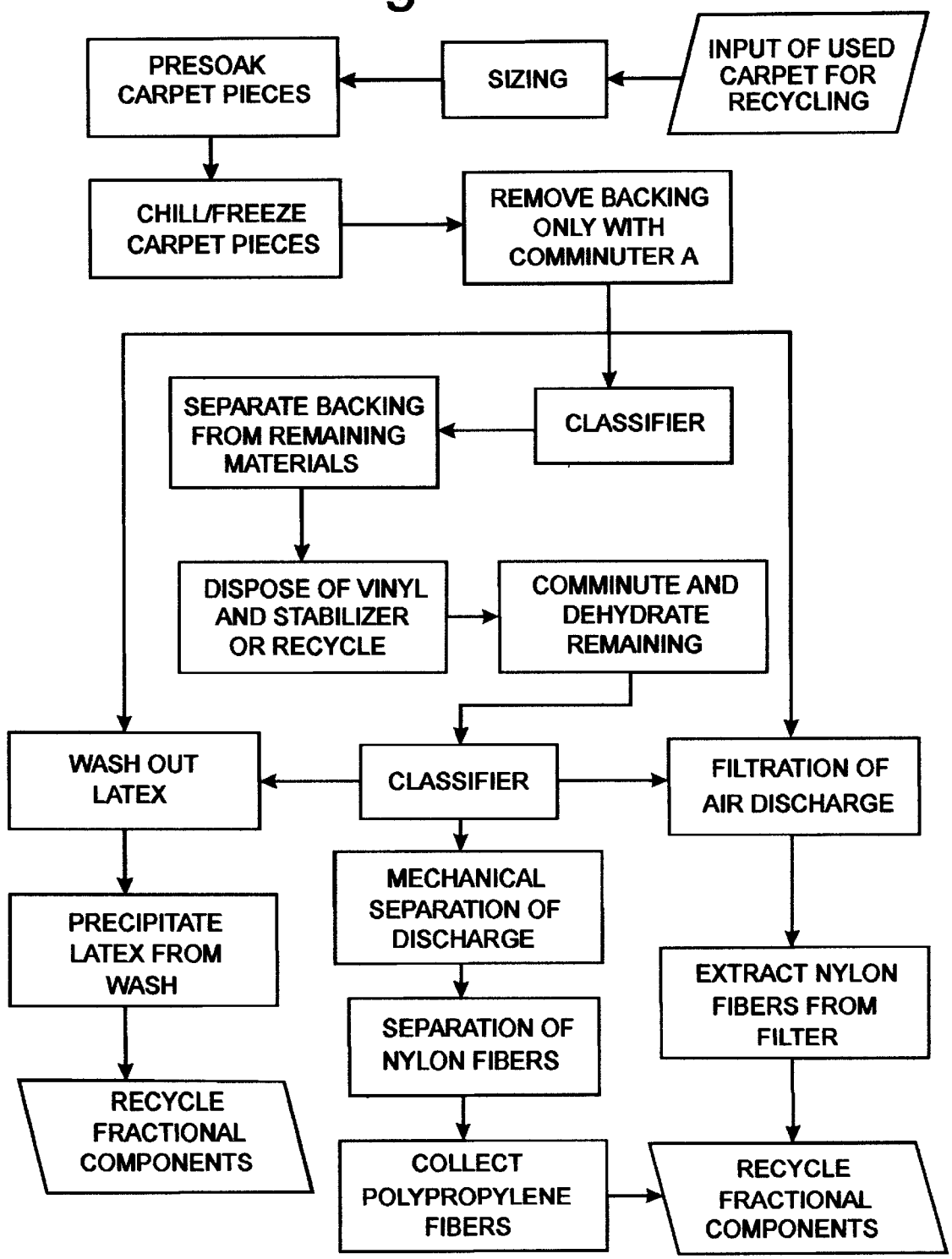
FIG. 4 is a process flow chart for the method of comminuting, separating and recovering fractional components of carpet for recycling thereof utilizing sequential comminuting/dehydrating machines, as schematically depicted in FIGS. 2A and 2B.

Referring first to FIG. 1, the apparatus for recovering fractional components of carpet, particularly jute-backed carpet can best be seen. The process flow chart is depicted in FIG. 4. While this disclosed process is considered to be particularly applicable to jute-backed carpet, the separation and recovery of vinyl-backed carpet can also be accomplished with this process. Utilizing the cyclonic, dehumidifying comminuter 10 as the central machine in the process, both pre-comminuting and post comminuting devices are necessary for the efficient separation and recovery of the fractional components of carpet.

Used carpet must be conditioned into suitably sized pieces, such as by cutting larger pieces of carpet into pieces having a size and shape suitable for the feeding of the carpet pieces through the material infeed 13. Such conditioning can be done as part of the comminution process, but more likely will be performed at a location remote from the comminuter 10, bringing the suitably sized pieces to the comminuter 10. The size of the comminuter 10 will be the primary factor in dictating the suitable size of the carpet pieces to be cut. It has been found that pre-cutting used carpet into squares having sides measuring between one and four inches and/or shredding the used carpet will provide satisfactory results. It will be understood by one skilled in the art that this process is not confined to the use of carpet pieces in either this size or particular shape. Pre-cutting machinery 25 can include a conventional hammer mill 26 that can break up or chop the used carpet into pieces having the size and shape needed to permit feeding through the air lock 13a. Alternatively, a shredding and cutting apparatus 27 can be used to first cut the used carpet into strips and then into squares of an appropriate size. One such cutting apparatus that has provided excellent results is a high pressure water jet cutting machine producing a very small diameter water stream (0.010 inch diameter or smaller) under extreme pressures of between 20,000 psi to 60,000 psi. Such a water jet effectively cuts carpet material in a precise manner.

After sizing or conditioning the used carpet into appropriately sized pieces, it is advantageous to pre-soak the pieces in water, preferably with agitation. Pre-soaking enhances the separation of the component fibers of the carpet in the comminuter, particularly with jute-backed carpets. The pre-soaking of the carpet pieces starts to break down the latex backing of the carpet before being introduced into the comminuter 10. Agitation helps to reduce the soak time needed for the carpet pieces and, therefore, the incorporation of an agitator 29 may reduce the size of the pre-soak tanks 28. With vinyl or rubber backed carpet, it has been found that chilling or freezing the sized carpet pieces enhances the removal of the vinyl backing, as the reduction of the temperature of the carpet being treated causes the backing material to become brittle, thereby allowing the backing material to be disintegrated at a more rapid rate than if the carpet were not chilled to a lower than general room temperature. A chill box can also be used to chill the ambient air being fed into the comminuter 10. Since air friction, input volume and pressure created by the fan 11 results in a temperature increase of approximately 50 degrees for the air being discharged from the fan 11, the pre-chilling of the ambient air being fed into the comminuter from the fan 11 would reduce the amount of warming of the carpet pieces during comminution, thus increasing the capacity of the machine 10.

It will be recognized by one skilled in the art that not all of these pre-comminution steps, and the machinery associated therewith will be necessary for each of types of carpet to be processed. For example, both a hammer mill 26 and a shredding/cutting machine 27 are not typically necessary; however, a hammer mill 26 and a simple cutting machine, such as the water jet cutting machine, might provide the best results, depending on the settings of the hammer mill 26. Furthermore, pre-soaking is not mandatory to the process, but does enhance the operation. With the use of a cyclonic, dehumidifying comminuter 10, the water is removed during the comminution step anyway.

Following the sizing and pre-soaking of the carpet pieces, the carpet is loaded into the material infeed 13 to be fed into the air stream forced through the conduit 12. In FIG. 1, an auger conveyor 22 schematically represents a mechanism for transporting the sized and pre-soaked carpet to the infeed 13. The carpet pieces then flow into the cylindrical portion 17 of the housing 15 to start the comminuting and dehydrating step in the process during which the fractional components of the carpet is separated. The carpet pieces are converted into a mass of fibers and powder. The nylon fibers are detached from the polypropolene fibers, etc., but are entwined together in the discharge of materials through the discharge opening 14.

In the case of jute-backed carpet, the latex will fall out the discharge opening 14 as dry powder, while the jute will typically be discharged as both a dry powder and in a fibrous form. Because the cyclonic dehumidify comminuter 10 both comminutes and dehydrates, the water absorbed by the carpet pieces during the pre-soak stage of the process is completely removed and is discharged with the air flow through the sleeve 18 into the discharged air recovery mechanism 20. Some of the lighter nylon fibers may also be trapped in the air flow and exit the comminuter 10. Accordingly, the discharged air recovery mechanism 20 will direct the flow of discharged air into a filtering mechanism 30 where the nylon fibers can be extracted from the air stream and recovered.

Final separation of the entwined fractional carpet components occurs after being discharged from the conical portion 17a of the housing 15 through the discharge opening 14. The entwined materials are conveyed to a wash bath 32 to remove the powdery latex. Some of the nylon fibers will float to the top of the wash bath 32 and will be removed by a recovery device 33, such as a static precipitator or screening mechanism, with the bath water to be recovered. The latex can be precipitated from the bath water either chemically or by filtering through a precipitator 34 and also recovered before the water is discharged or recirculated back through the wash bath. Materials exiting the wash bath 32 can receive a final rinse before being conveyed to a carding apparatus 35. This water can be recirculated back into the wash bath tank 32.

The nylon and polypropylene fibers that are still entwined after being discharged from the wash bath tank 32 are conveyed to a carding apparatus 35 to effect separation of the component materials. The entwined nylon and polypropylene fibers can be separated in the carding apparatus 35 by a combing process, commonly referred to as "carding", or by the use of static charges, or by a combination of both. Separation of these fibers can also be accomplished by using air or a washing process either alone or in combination with carding or static charges. Carding also aligns all the fibers so that they are oriented in the same direction, thus allowing the heavier materials, such as the polypropylene fibers, to drop out of the mass or to be removed by static charges or pressure gradients or both. The separated materials can then be recovered and re-utilized in the manufacturing of new carpet.

The comminuter works on the principles of density and centrifugal force; therefore, heavier material components such as the latex tends to reach the outer periphery of the cone 17a before the lighter material components. It has been found that locating ports at specific locations on the cone 17a, (not shown) material can be removed in their specific individual forms, including the latex, the polypropylene fibers and the nylon fibers, without requiring all of the processing steps described above. All materials are separated inside the comminuter 10. Accordingly, the different densities of the material components allow the extraction thereof along the periphery of the cone 17a. Some materials components may come out of the bottom 14 of the comminuter 10 together and require all of the processing steps described above. Using the cone 17a with strategically located ports (not shown) as a classifier has also worked with respect to vinyl or rubber backed carpet.

Figure 5:
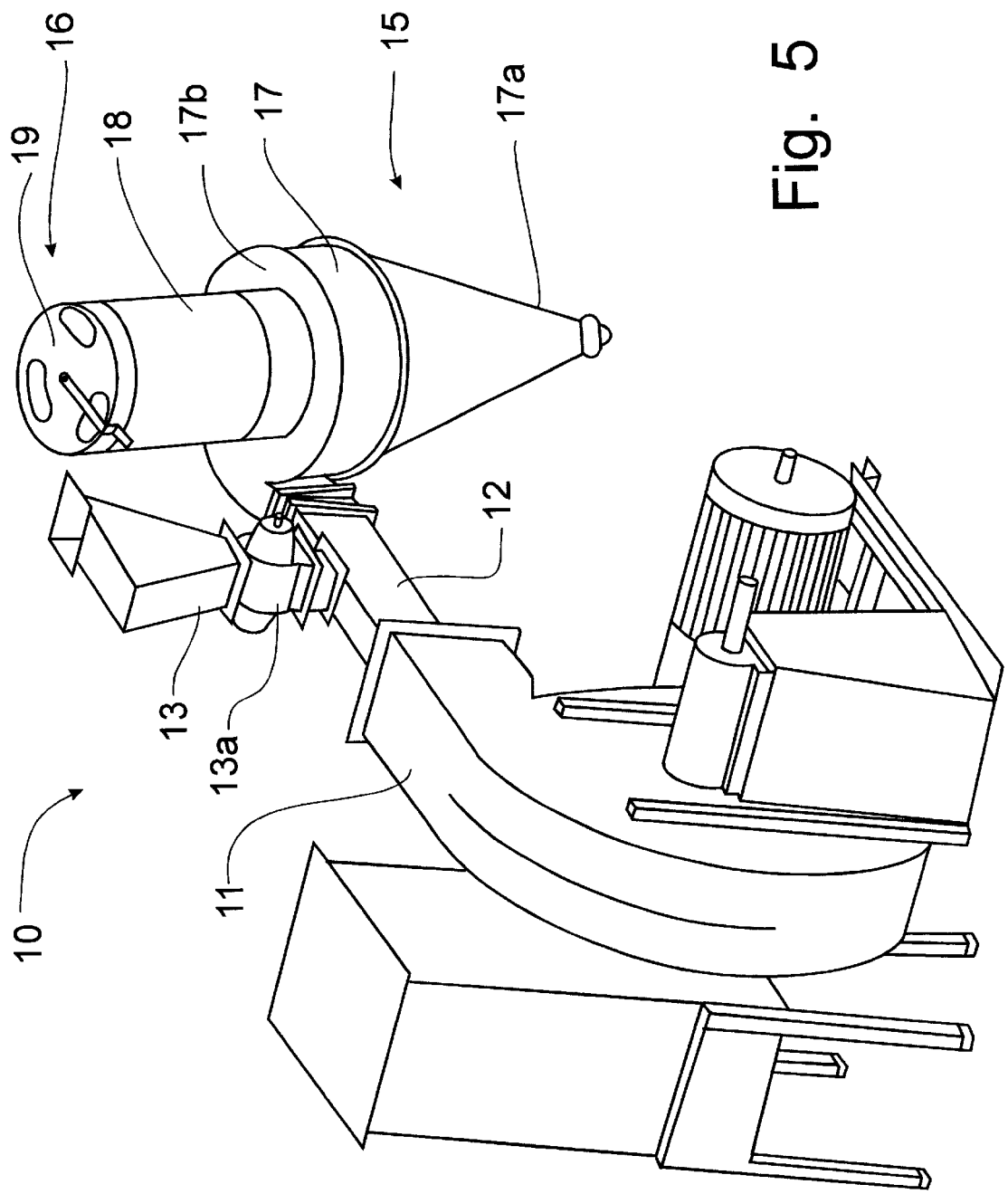
FIG. 5 is a perspective view of a cyclonic comminuting/dehydrating machine incorporating an alternative embodiment of the instant invention.

Vinyl-backed carpet can also be separated into its fractional components and the components recovered for recycling by the above-described process. The problem encountered by using this process to recover vinyl-backed carpet components is that the full comminution of the carpet pieces also comminutes and separates the vinyl backing and the fiberglass fibers that are used as a stabilizer. Freeing fiberglass fibers, whether carried up through the sleeve 18 to be recovered in the filtering mechanism 30 or allowed to fall through the discharge opening 14 at the bottom of the comminuter 10, is not desirable. The preferred process for recycling vinyl-backed carpet is described below with respect to FIGS. 2, 3 and 5.

Figure 2A:
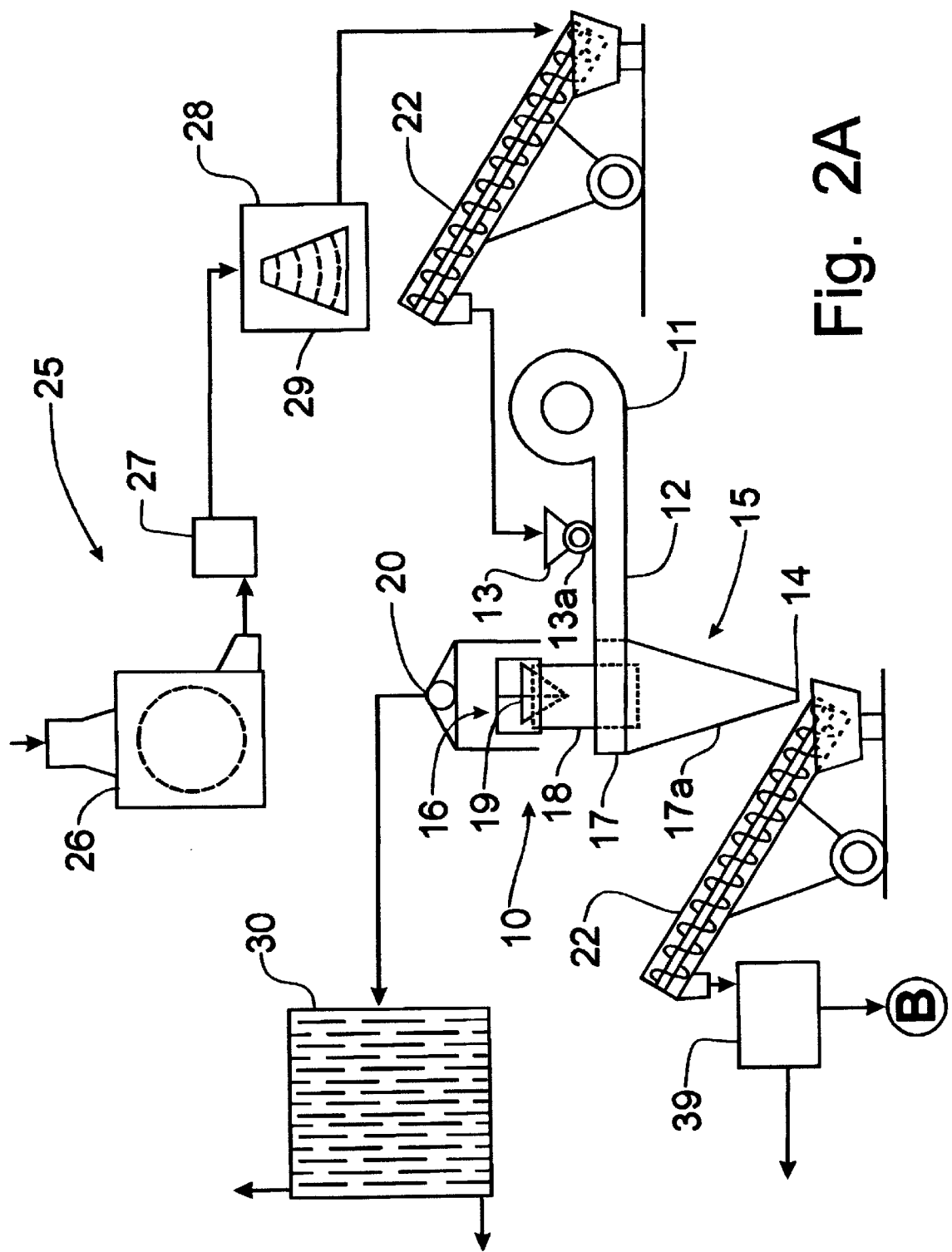
FIG. 2A is a schematic view of apparatus corresponding to the first comminuter/dehydrator for accomplishing the comminution, separation and recovery of carpet utilizing sequential comminuting/dehydrating steps, particularly for the recycling of vinyl-backed carpet.
Figure 3:
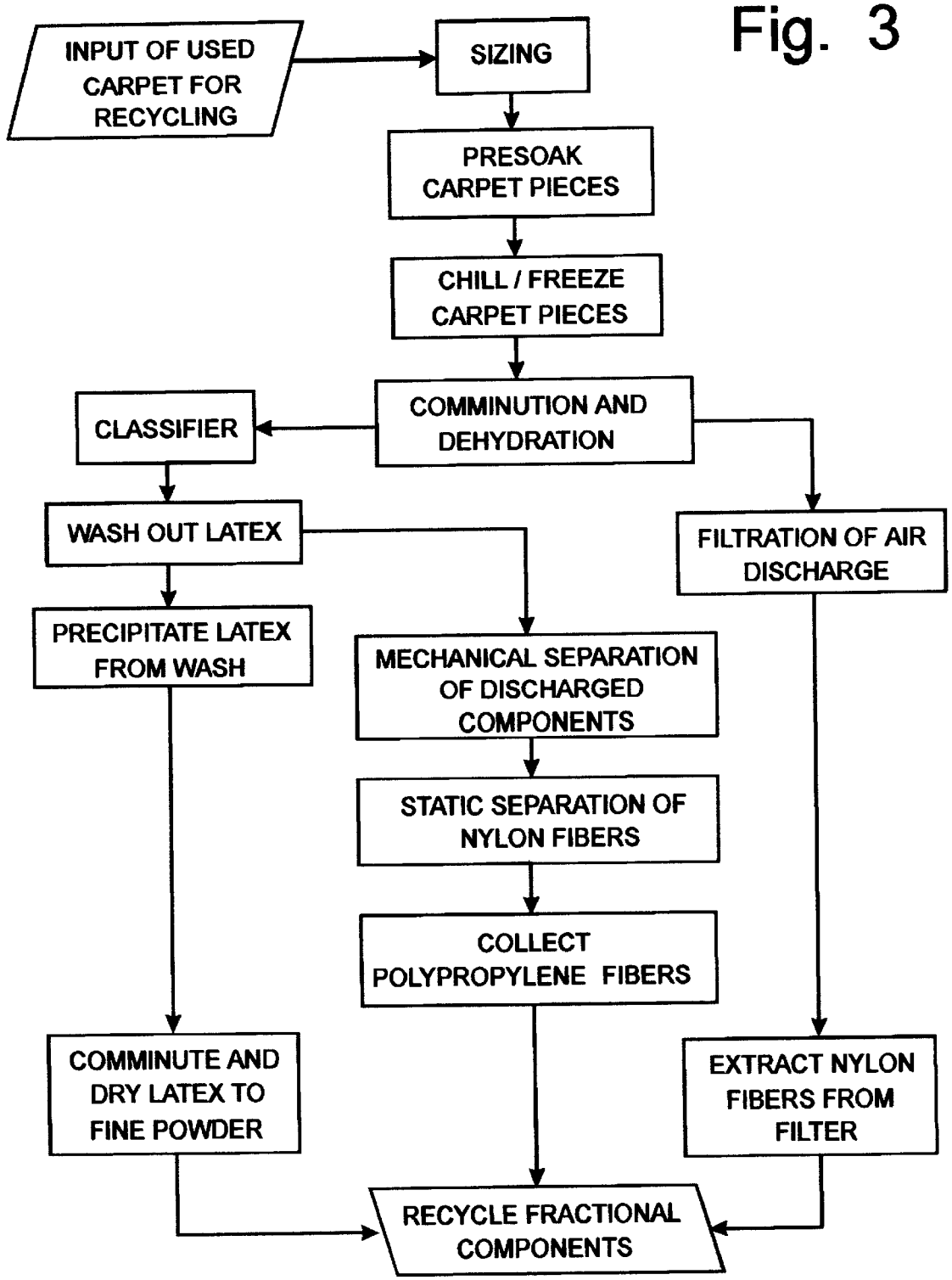
FIG. 3 is a process flow chart for the method of comminuting, separating and recovering fractional components of carpet for recycling thereof utilizing a single comminuting/dehydrating machine, as schematically depicted in FIG. 1.

Referring now to FIG. 2A, the first phase of the process is substantially the same as described above with respect to FIG. 1. The used carpet is selectively pre-conditioned before being fed into the first comminuter 10, such as by shredding or cutting the carpet into appropriate sized pieces and by pre-soaking. Even though vinyl-backed carpet does not use latex as a stabilizer, the absorption of water into the carpet pieces will still enhance the subsequent comminution process; however, pre-soaking of vinyl-backed carpet is not a necessary step in the process.

More particularly, the carpet pieces are preferably chilled to a temperature lower than the ambient temperature by soaking the carpet in chilled water. The backing material of the carpet will become more brittle and heavier. Both factors allow the carpet material to impact harder into the internal rasp bars 68 of the housing 15, as well as into itself, upon introduction of the material into the housing 15, thereby decreasing the time required for separation of the fractional components of the carpet material. It has been found that the use of salt water chilled to a negative 3 degrees F has produced good results. It will be recognized by one skilled in the art that the cyclonic comminuter 10 operates at ambient temperatures, but the temperature of the air fed into the housing 15 is higher than ambient because of friction and the high air speeds induced by the fan 11. Leaving the carpet pieces at ambient temperatures, as opposed to chilling the material before being fed into the comminuter 10, increases the separation time and, as a result, reduces throughput.

The carpet pieces are then fed into the first cyclonic dehumidifying comminuter through the infeed 13 and into the air stream flowing through the conduit 12. The primary difference between this first phase of separating vinyl-backed carpet and the process above for recycling primarily jute-backed carpet is the comminution setting on the first comminuter 10. Preferably, the sleeve 18 is withdraw to a shallow setting within the housing 15 and the damper 19 is set so that the extent of comminution is set at a relatively low level so that only the vinyl backing is removed from the carpet pieces without any significant disruption of the remaining fractional components of the carpet pieces.

Because the vinyl material is substantially heavier than the other carpet materials, the vinyl will settle out by gravity through the discharge opening 14 at the bottom of the conical portion 17a of the first comminuter. Generally, the vinyl material will come out of the first comminuter 10 in comparatively large pellets, which permit relatively easy separation of the vinyl materials from the remaining carpet. A separating device 39, such as a sieve, screening apparatus, air stream or other appropriate devices, can be utilized to separate the vinyl from the remaining carpet materials. Because of the incomplete comminution of the carpet pieces, most of the fiberglass stabilizer remains intact with the vinyl.

Figure 2B:
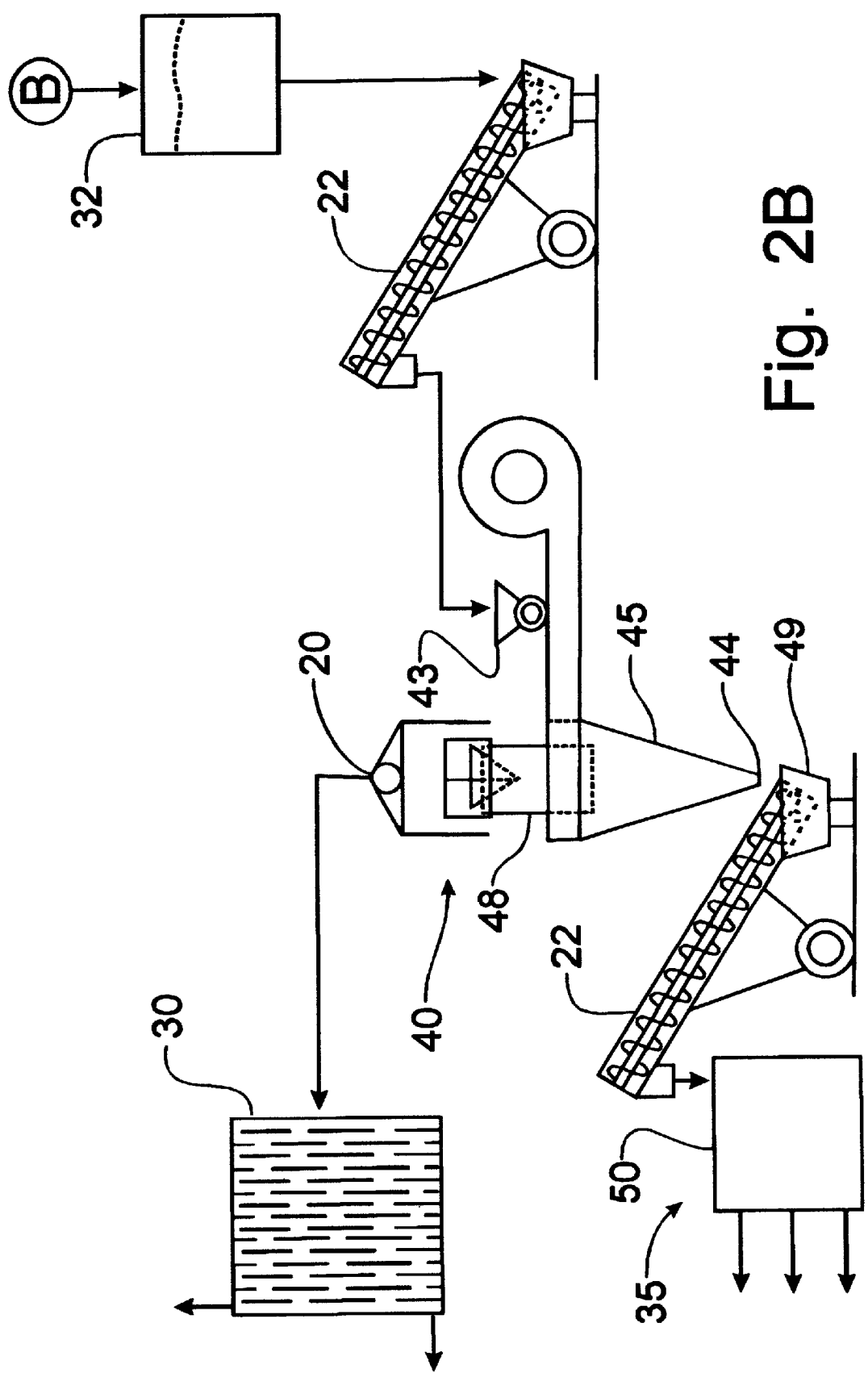
FIG. 2B is a schematic view of apparatus corresponding to the second comminuter/dehydrator for accomplishing the comminution, separation and recovery of carpet utilizing sequential comminuting/dehydrating steps, particularly for the recycling of vinyl-backed carpet.

Referring now to FIG. 2B, the remaining carpet material is then preferably washed in a secondary wash tank 32 to remove any powdery residue and to add additional moisture to the materials to enhance the further comminution thereof in the second cyclonic dehumidifying comminuter 40. Again a auger conveyor 22 symbolically depicts the conveyance of the remaining carpet materials from the wash tank 32 to the material infeed 43 of the second comminuter 40 which is set for full comminution by lowering the sleeve 48 well into the housing 45.

The comminuting effect of the second cyclonic dehumidifying comminuter 40 is similar to the operation defined above with respect to FIG. 1. The nylon fibers are disengaged from the polypropylene fibers and are generally recovered in the filtering mechanism 30, which can be a shared filter with the first comminuter 10 or a separate device. The polypropylene fibers, along with some entwined nylon fibers, are discharged through the discharge opening 44 of the second comminuter 40 into a collection device: 49, where the fibers are transported to a separating mechanism 50, which may including a carding apparatus or static or pressure gradient devices, as described above, to recover the polypropylene and nylon fibers. The use of ports (not shown) on the cone 45 also allows for a classification of material components by density.

Any remaining backing materials are reduced to powder and generally exit the discharge opening 44, but may be entrapped in the air flow for removal by the filtering mechanism 30. Accordingly, the separating mechanism 50 may require a tertiary bath to cleanse the polypropylene and nylon fibers. One skilled in the art will realize that the above described process utilizing first and second cyclonic dehumidifying comminuters 10, 40, can also be used for the recycling of jute-backed carpet pieces with most of the jute backing and latex stabilizer being removed in the first comminuter 10 and the remaining fibers recovered from the second comminuter 40.

In the alternative, it is believed that the fractional carpet components may be recovered in the comminuter before being discharged through the discharge opening. Because density of materials effects the path of each individual fractional component material inside of the comminuter 10, 40, such as the nylon 6—6 or nylon 6 or polypropylene fibers, separation of these materials can be accomplished inside of the comminuter by utilizing the density differences and centrifugal forces, or by the use of static electricity in the form of an electrostatic precipitator.

The lighter materials, such as the nylon fibers, can be brought out the top of the comminuter with the air flow and collected by the filtering mechanism 30. The heavier and larger materials, such as the polypropylene fibers will gravitate toward the discharge opening and can be collected before being discharged. The other heavier materials, such as the latex and vinyl components will be pulverized into a powder and allowed to exit the discharge opening at the bottom or through the classifier ports on the side of the cone.

Referring now to FIGS. 5–11, an alternative apparatus for recovering fractional components of carpet can best be seen. As described above, the cyclonic comminuter will separate the fractional carpet components. The various desired forms of the separated components can be obtained by extracting the nylon fibers from inside the comminuter in a manner to be described in greater detail below.

In the separation of the fractional components of carpet, the polypropolene materials, latex generally come out the bottom of the comminuter. The nylon fibers, however, tend to stay in the chamber longer and tend to entwine themselves into somewhat of a woven pattern. Placing a nylon extraction valve 60 on the top wall 17b of the cylindrical portion 17 of the housing 15 allows these nylon fibers to be extracted from within the comminuter 10 before they can be exhausted with the air stream up the cylindrical sleeve 18.

Referring now to FIGS. 6–9, the details of the valve 60 can best be seen. The valve 60 includes a body portion 61 with an opening 62 extending vertically therethrough and having a shaft 63 extending generally horizontally through the body portion 61. The shaft 63 is also formed with an opening 64 therethrough and alignable with the opening 62 through the body portion 61, such that it has a construction very similar to a common quarter-turn ball valve and operates in substantially the same manner.

The shaft 63 can be rotated in a continuous manner via an external power source (not shown), such as a gear motor or a variable: speed motor to provide the proper rotation of the shaft 63 for the efficient extraction of the nylon fibers. If the valve 60 remains open too long, the valve will extract material from the housing 15 before it has become adequately separated. On the other hand, the failure to keep the valve 60 open long enough will result in an overburdening of the nylon fibers within the housing 15 and the loss thereof through the exhaust sleeve 18.

Preferably, however, the valve 60 will include an arm (not shown) attached to the shaft 63 in a manner that a suitable mechanism (not shown) can oscillate the shaft 63 through the arm (not shown) to open and close the valve 60 in a timely fashion to extract the separated nylon fibers, but not unseparated material. The timing of this oscillation movement is dependent upon the other variables of the operation of the cyclonic comminuter 10 and will be best reached through trial and error. Suitable mechanism (not shown) for oscillating the shaft 63 can include any known method of converting rotary motion, such as a bell crank connected to a rotational power source, or the use of air or hydraulically powered linear actuators or cylinders.

Preferably, the shaft 63 will be oscillated back and forth instead of rotated because a rotation of the shaft 63 tends to pinch fibers between the hole 64 of the shaft 63 and the corresponding opening 62 in the body portion 61 which will not get cleared with the rotation of the shaft in the same continuous direction. The oscillating motion of the shaft 63 will tend to clear this material from the hole 64 each time the valve 60 is opened with the reverse oscillation of the shaft 63. Furthermore, the bottom opening 62a in the body portion 61 of the valve 60 should preferably be slightly larger than the opening 64 through the shaft 63 to allow relief for the trapped nylon fibers. Air going through the valve 60 from within the cylindrical portion 18 of the housing 15 forces the nylon to escape up through the valve 60.

Figure 10:
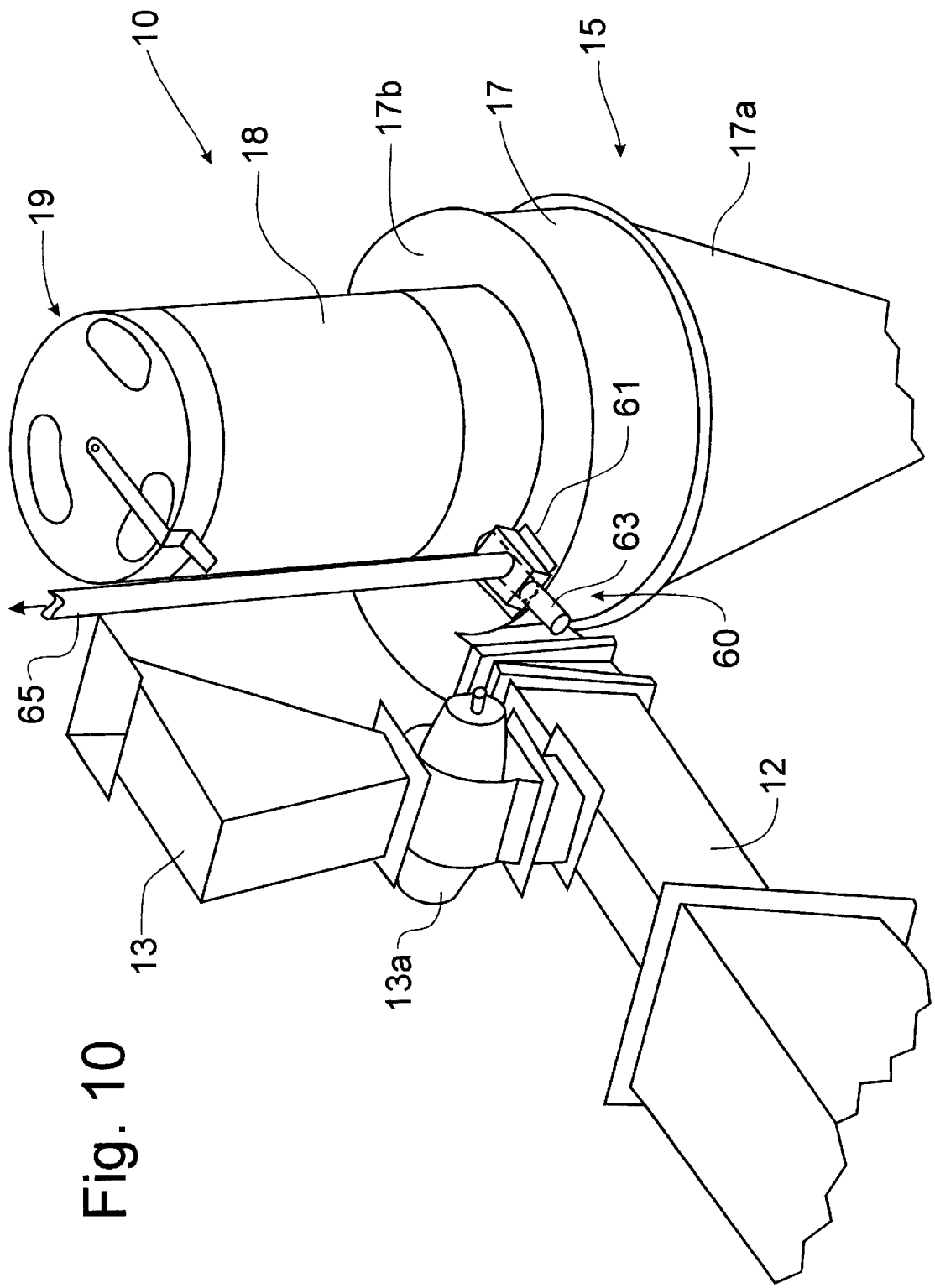
FIG. 10 is an enlarged partial perspective view of the cyclonic comminuting/dehydrating machine having mounted thereon a nylon extraction valve according to the principles of the instant invention.

Referring now to FIG. 10, one skilled in the art will see that the valve 60 is located 1 on the top wall 17b of the cylindrical portion 18 of the housing 15 immediately next to, and counterclockwise from, the infeed conduit 12. This location permits the carpet material fed into the housing 15 through the infeed conduit 12 to travel the greatest distance around the interior of the housing 15 before reaching the valve 60. The timing of the oscillation of the shaft 63 to open the valve 60 for the extraction of nylon fibers from the cylindrical portion 18 of the housing 15 is such that the carpet material can travel several times around the cylindrical portion 18 of the housing 15 before being extracted, thus enabling maximum separation opportunity. A discharge conduit 65 will convey the collected nylon fibers to a remote collection device 67 for further appropriate treatment.

As the nylon material separates from the other fractional components of the carpet material, the lightness of the nylon fibers allow the specific air currents within the housing 15 to direct the nylon fibers toward the top of the cylindrical portion 18 where the opening of the valve 60 can effect the extraction thereof without disrupting the operation of the comminuter to separate the carpet material. The placement of a rasp bar 68, shown in FIG. 11, on the interior of the circumferential wall of the cylindrical portion 18 such that the vanes 69 of the rasp bar 68 direct air upwardly toward the valve 60 facilitate the creation of the specific air currents to enable the extraction of the nylon fibers from within the housing 15.

The nylon fibers can be extracted through the classifying ports (not shown) on the side of the cone 17a. Since the nylon fibers are lighter (less dense) than the latex or vinyl backing materials, the extraction ports for nylon fibers will be lower on the cone 17a than the extraction ports for the heavier, more dense, material components such as latex or vinyl.

Rasp bars 68, such as shown in FIG. 11, of relatively short lengths, placed on the underside of the top of the chamber 17 allows for more rapid disintegration of the carpet pieces and an increase in capacity for the comminuter 10. When the proper setting for the sleeve 18 extending inside the chamber 17 is properly established for a given material, rasp bars 68 placed on the outside of the sleeve 18 which extends inside the chamber 17 also aids in the rapid disintegration of the carpet. Rasp bars, placed vertically near the top of the conical portion 17a and extending downwardly toward the discharge opening 44 at the bottom of the cone 17a, will further aid in the rapid disintegration of the carpet pieces when arranged to divert air upwardly. Such an arrangement forces the larger pieces of carpet that may have fallen out of the cylindrical chamber 17 before being completely dismantled into fractional components back up into the chamber 17. The movement of air flowing over the rasp bars is diverted upwardly by the vanes. The upwardly directed air carries the larger pieces back into the chamber 17 for further disintegration.

Because of the potential volume& of used carpet to be processed and the fractional components thereof to be recovered and recycled, it is expected that a typical processing plant will require several units, or multiples of units as described above, in order to process a substantial amount of carpet efficiently. In such an operation, many of the machinery components described above can be combined and constructed in a larger magnitude. For example, the filtering mechanism 30 can be constructed to process the air flow from several comminuters 10. Similarly, the pre-soak tanks 28 and the pre-cutting machinery 25 can be sized to accommodate the volume of carpet pieces that will satisfy the capability of multiple comminuters. The same order of magnitude would also apply to the post-comminuting machinery, such as the carding apparatus 35 and the wash bath tank 32.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A method of separating and recovering nylon fiber fractional components of carpet, comprising the steps of:

feeding said carpet into an air flow into a cyclonic dehumidifying comminuter to separate the fractional components of said carpet within a chamber of said comminuter;

intermittently operating a nylon: extraction valve to extract nylon fibers as a fractional component of said carpet from said chamber of said comminuter;

filtering the air flow after being exhausted from said comminuter through a filtering mechanism to recover fractional component fibers entrained in the air flow; and discharging other fractional components of said carpet from a discharge opening at the bottom of said comminuter for recovery thereof.

2. The method of claim 1 further comprising the step of:

directing air upwardly within said comminuter chamber to urge nylon fibers toward the nylon extraction valve.

3. The method of claim 2 wherein said intermittent operating step includes the step of:

rotating said nylon extraction valve to expose a valve opening to said comminuter chamber as said valve is rotated.

4. The method of claim 2 wherein said intermittent operating step includes the step of:

oscillating said nylon extraction valve to expose a valve opening to said comminuter chamber.

5. The method of claim 4 wherein said oscillating step extracts nylon fibers from said comminuter by said nylon extraction valve located on a top wall of said comminuter chamber.

6. A method of separating and recovering fractional components of carpet, comprising the steps of:

sizing said carpet by reducing said carpet to carpet pieces having a size within a pre-determined range of sizes;

feeding said carpet pieces into an air flow of a cyclonic dehumidifying comminuter to separate the fractional components of said carpet pieces to create a mass of separated, entwined fractional component fibers discharged from a discharge opening of said comminuter;

extracting nylon fibers from said chamber before substantial comminution of said carpet pieces has been accomplished;

passing said mass of entwined fractional component fibers through a separating mechanism to separate the entwined fractional component fibers from said mass discharged from said comminuter; and collecting said fractional component fibers from said separating mechanism.

7. The method of claim 6 wherein said step of extracting nylon fibers includes the steps of:

oscillating a nylon extraction valve between an operative position and an inoperative position to intermittently extract nylon fibers from said cyclonic comminuter.

8. The method of claim 7 further comprising the step of:

directing air upwardly within said comminuter chamber to urge nylon fibers toward the nylon extraction valve.

* * * * *